United States Patent

[11] 3,615,260

| [72] | Inventors | Charles K. Hanson<br>Salt Lake City, Utah;<br>Milton E. Wadsworth, Manila, Philippines |
|---|---|---|
| [21] | Appl. No. | 805,073 |
| [22] | Filed | Jan. 2, 1969 |
| [45] | Patented | Oct. 26, 1971 |
| [73] | Assignee | University of Utah<br>Continuation-in-part of application Ser. No.<br>554,459, June 1, 1966, now abandoned. |

[54] LEACHING BERYLLIUM
3 Claims, 5 Drawing Figs.

[52] U.S. Cl. .................................................. 23/299,
23/300, 23/304, 23/312, 23/24 B, 23/113, 75/101,
75/121
[51] Int. Cl. ..................................................... C01f 3/00,
C01b 33/24
[50] Field of Search ............................................ 23/312 R,
300, 24.2, 297, 298, 299, 304, 186, 24 B, 112,
113; 75/101, 108, 121

[56] References Cited
UNITED STATES PATENTS

| 822,444 | 6/1906 | Haber ........................... | 23/24 B |
| 854,560 | 5/1907 | Bran ............................. | 23/24 B |
| 1,777,122 | 9/1930 | Lowenstein .................... | 23/24 B |
| 1,858,771 | 5/1932 | Fisher ............................ | 23/24 B |
| 2,063,811 | 12/1936 | Jaeger ........................... | 23/24 B |
| 2,238,206 | 4/1941 | Adamoli ........................ | 23/24 B |
| 2,242,492 | 5/1941 | Zeppelin ....................... | 23/24 B |
| 2,298,800 | 10/1942 | McKee .......................... | 23/24 B |
| 2,242,493 | 5/1941 | Zeppelin ....................... | 23/24 B |
| 2,344,480 | 3/1944 | Adamoli ........................ | 23/24 B |

FOREIGN PATENTS

| 473,499 | 5/1951 | Canada ......................... | 23/24 B |
| 499,495 | 1/1939 | Great Britain ................. | 23/24 B |

OTHER REFERENCES

Mellor, Comp. Treatise on Inorg and Theo Chem., Vol. 4, 1923, pp. 207, 208, 209, 210, 216, 224, 225, 226, 227, 228.

Winter, Prod. of Beryllium Oxide from Beryl, 1939, pp. 1, 7, 9, 10, 13, 14, 15, 16, 17, 18, 19, 22, 23, 24, 25, 32.

*Primary Examiner*—Norman Yudkoff
*Assistant Examiner*—S. J. Emery
*Attorney*—Lynn G. Foster ABSTRACT: A method of leaching beryllium from beryllium ore and separating the beryllium from contaminates in the leach liquor, the leaching method comprising exposing beryllium ore to a concentrated caustic solution under elevated temperature conditions. The beryllium along with certain contaminates is separated from the leach liquor by (a) diluting the solution, adding calcium chloride or other soluble calcium salt, and coprecipitating beryllium, calcium hydroxide and other contaminates, or by (b) diluting the solution, adding calcium hydroxide, or calcium oxide and heating in an autoclave to suitable temperature for an appropriate time interval. Contaminates, including silica, may be removed from the leach solution by adding calcium hydroxide (or oxide) without reducing the pH (without diluting the solution) and heating in an autoclave at suitable temperature for an appropriate time interval. The beryllium under these conditions remains in the solution. Under conditions (a) or (b) the precipitate which includes the beryllium is treated by common chemical procedures for isolation of the beryllium as beryllium hydroxide.

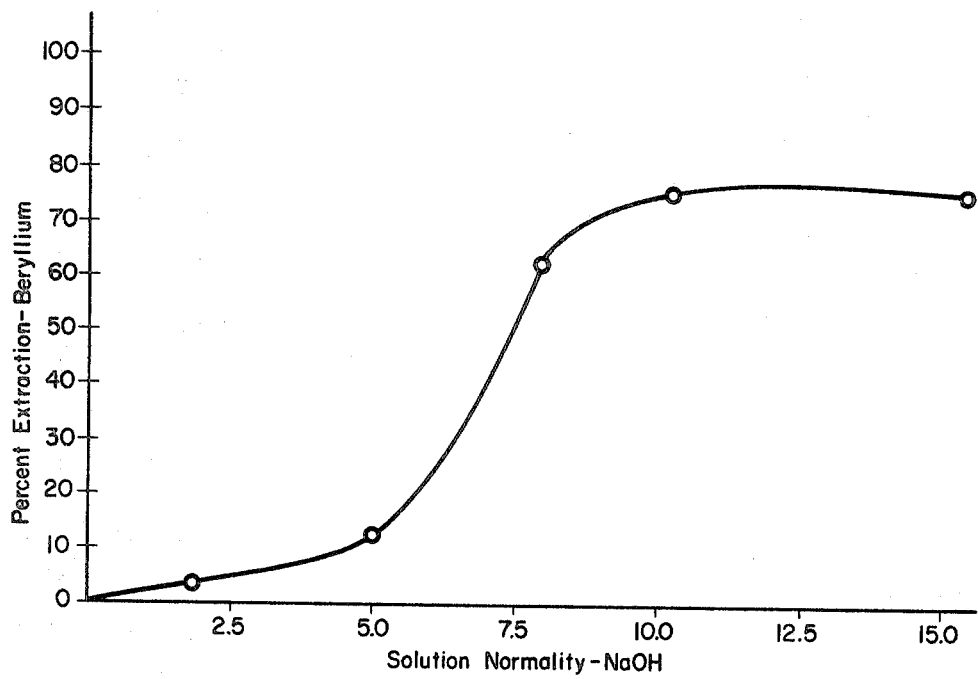
FIG. I.
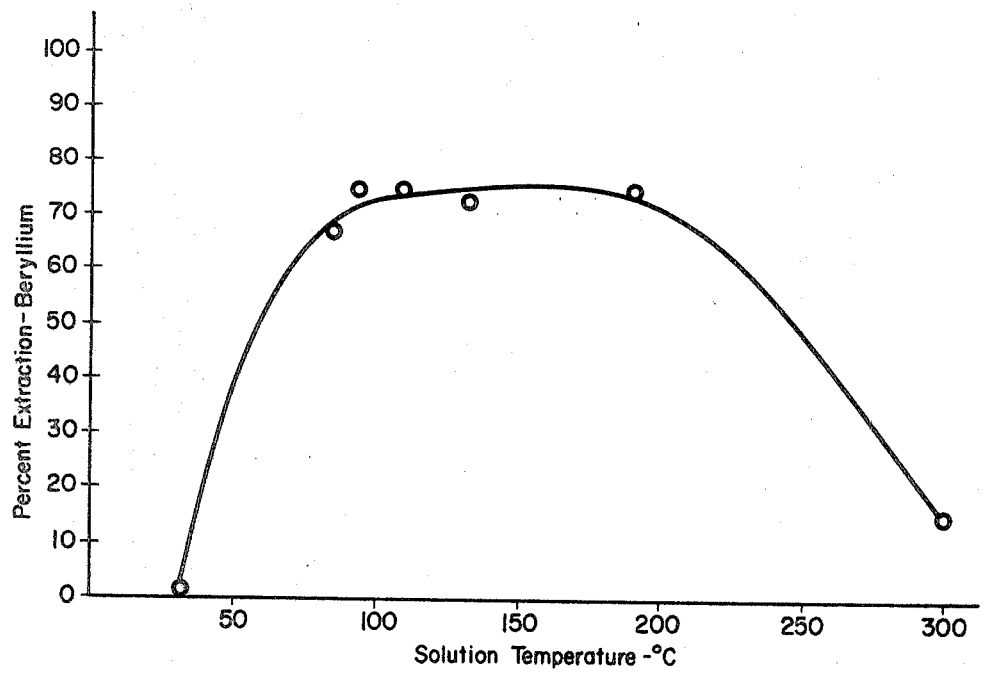
FIG. 2

INVENTORS.
CHARLES K. HANSON
MILTON E. WADSWORTH

BY Lynn G. Foster
ATTORNEY

LEACHING BERYLLIUM

This invention relates to leaching of beryllium from beryllium bearing ore and more specifically leaching beryllium with a caustic solution and separating beryllium compound from contaminates in the leach liquor. This is a continuation-in-part of our copending U.S. Pat. application Ser. No. 554,459, filed June 1, 1966, now abandoned. The generally accepted commercial process of recovering beryllium comprises leaching beryllium ore with strong acids, particularly where the ore is of low grade bertrandite $H_2Be_4Si_2O_9$ or saponite (a montmorillonity clay composition having berterandite therein). This method is fairly successful in freeing the beryllium from the gangue. However, the beryllium remains grossly contaminated with silica, aluminum, iron manganese and magnesium, which contaminates are extremely difficult and expensive to separate. Other conventional methods of beryllium extraction are disadvantageous because the production costs tend to be prohibitive.

Therefore, it would be a significant and worthwhile contribution to the art to provide a process whereby beryllium could be extracted from ore and essentially completely separated from contaminating substances relatively inexpensively. The present invention provides such a process.

The presently preferred method of leaching beryllium comprises leaching beryllium ore with a concentrated caustic solution such as sodium hydroxide and thereafter separating contaminates, e.g. principally silica and calcium, from the beryllium. One presently preferred method of separating dissolved silica from the alkaline solution containing beryllium without simultaneously removing beryllium from solution comprises adding an excess of calcium hydroxide or calcium oxide to the solution without substantially decreasing the pH of the solution and selectively precipitating calcium silicate under controlled temperature conditions.

Another preferred method of separating beryllium from contaminates in the alkaline solution comprises diluting the solution (lowering the pH) then adding a soluble calcium salt ($CaCl_2$, for example) in one instance, or by adding calcium hydroxide or calcium oxide in another, and heating the solution to precipitate the beryllium along with silica and calcium. The beryllium is then separated from the precipitate by conventional chemical processes.

Accordingly, it is an object of this invention to provide a process for recovering beryllium from ore and efficiently separating it from contaminating substances.

It is another object of the present invention to provide a novel method of separating dissolved silica and other contaminates from alkaline solutions containing beryllium by precipitating the beryllium from solution.

It is another important object of the present invention to provide a novel method utilizing calcium hydroxide or calcium oxide to precipitate contaminates under controlled temperature conditions. These and other objects and features of the present invention will become more fully apparent from the following description and appended claims taken in conjunction with the accompanying drawings wherein:

FIG. 1 is a graphic representation of the variation in beryllium recovery caused by change in alkali concentration at 200° C.

FIG. 2 is a graphic representation of the effect of temperature change upon beryllium recovery where the sodium hydroxide concentration is held constant at 10 N.

Figure 3:
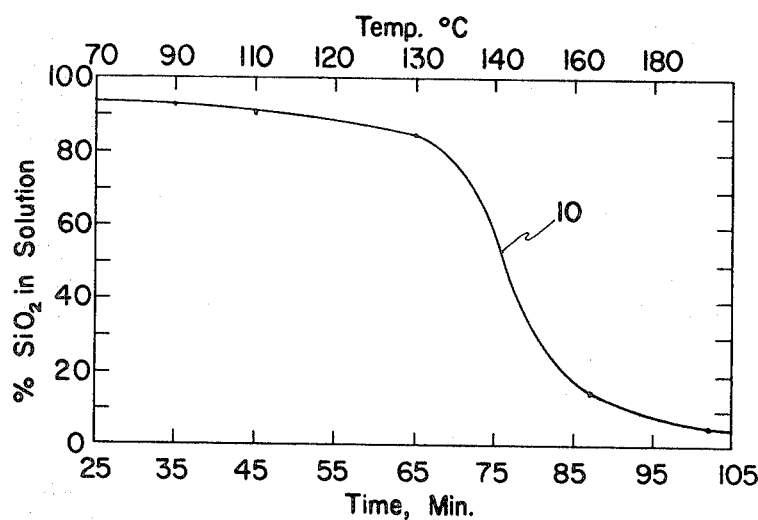

FIG. 3 graphically illustrates the effect of a change in temperature on the percentage of silica in solution with 10 percent excess addition based upon formation of $CaSiO_3$ of calcium hydroxide.

Figure 4:
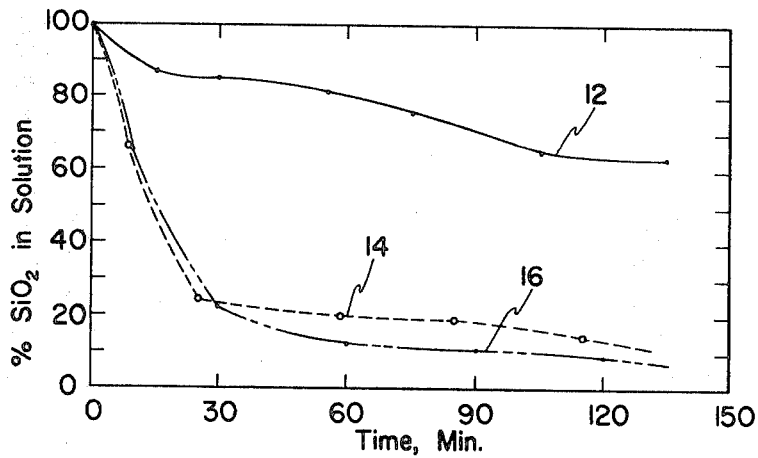
Figure 5:
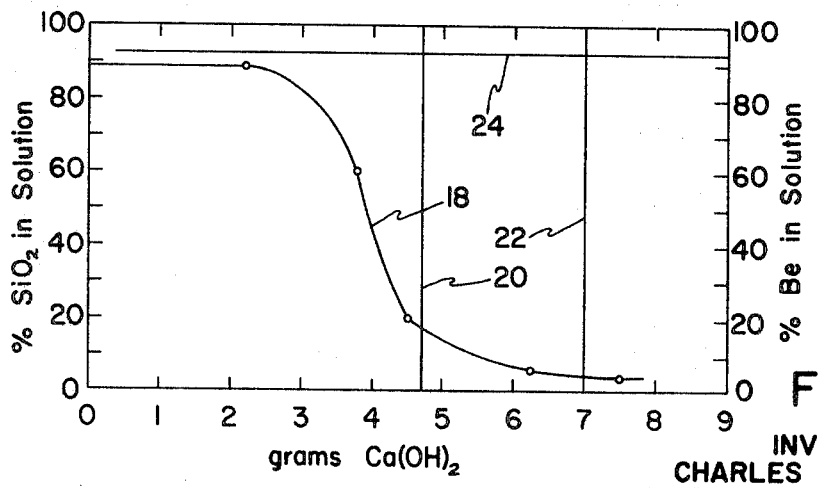

FIG. 4 graphically illustrates the time-related relationship of the amount of silica in solution at three distinct temperatures; and FIG. 5 graphically illustrates the effect of the calcium-silica ratio at a distinct temperature on the percent of silica in solution.

In the presently preferred mode of this invention, a predetermined quantity of crushed beryllium bearing ore, preferably of about −100 mesh (texture), is leached with a caustic solution of preferably approximately 10 N sodium hydroxide (see FIG. 1) in an open container or in an autoclave. Bertrandite and Saponite ores have proved particularly responsive to the process of this invention. The temperature of the solution is raised, preferably to or near the boiling point of the mixture, (see FIG. 2). The mixture is thereafter retained at the elevated temperature or temperatures and stirred for a predetermined time. The leach liquor is thereafter cooled and removed, preferably by centrifugation, and thereafter diluted, usually to a hydroxide concentration of the order of about 1.5 N, causing a substantial percentage of the beryllium compound to precipitate. ADdition of proportional amounts of calcium chloride and silica can be used to complete the precipitation. If desired, calcium oxide or calcium hydroxide may be added and the temperature of the solution raised in an autoclave until the beryllium and silica precipitate.

The leach liquor is then precessed to reclaim and reconcentrate the sodium hydroxide by well-known evaporative techniques while excess calcium and calcium silicate in the precipitate may be removed by processes well known in the art. Specifically, the excess calcium and most of the silica may be readily removed by dissolving the precipitate in a small amount of sulfuric acid and warming to dehydrate silica. The acid may then be diluted and the solids separated by filtration. The beryllium in the resulting filtrate may be precipitated by ammonia and filtered off as a comparatively pure beryllium hydroxide. Any silica carried into the precipitate may be volatilized with HF and $H_2SO_4$ if necessary. A reasonably good separation of any residual aluminum from beryllium can be accomplished by a bicarbonate precipitation.

The invention will be more fully understood by reference to the following examples:

EXAMPLE 1

Suspensions of 10 grams of relatively low grade beryllium ore in 50 milliliters of 10 N (Normal) sodium hydroxide were slowly heated in an open vessel to boiling (preferably consuming about 30 minutes), boiled for 10 minutes, then cooled. Samples were centrifuged removing about 70 to 75 percent of the liquid. Thereafter, an additional volume of 10 N sodium hydroxide solution was added to the pulp bringing the total volume to 50 milliliters. The mixture was again reheated, boiled, cooled, centrifuged and decanted. The gangue or pulp was thereafter washed twice with water. Analysis indicated that the following percentages of beryllium were extracted in the solutions:

TABLE 1

| | Percent of Total Beryllium | |
| --- | --- | --- |
| | Sample A | Sample B |
| First leach liquor | 60.4 | 58.8 |
| Second leach liquor | 24.7 | 26.5 |
| Wash water | 6.3 | 6.6 |
| Total | 91.4 | 91.9 |

EXAMPLE 2

Suspensions of 50 grams of crushed ore in 250 milliliters of 10 N sodium hydroxide were heated, boiled for 5 to 10 minutes and cooled. The leach liquor was separated completely by centrifugation and the leaching process was repeated with a second addition of sodium hydroxide. The pulp was then washed with water. The solutions and washings were then combined. An aqueous solution of calcium chloride was added to the leach liquor to give a Ca:Be mole ratio of 3:1. The resulting liquid was 1.3–1.5N in sodium hydroxide. Under these conditions, 95 percent of the beryllium was precipitated with calcium hydroxide, calcium silicate, and other hydroxides.

In further tests upon the precipitation of beryllium from alkaline solution, samples containing approximately 9.7 milligrams of dissolved $SiO_2$ per milliliter of solution were heated with $CaCl_2$ solution as indicated in table II.

TABLE II

Effect of Dissolved Silica on Precipitation of Beryllium

| mg. of Be/ml. | mg. of $SiO_2$/ml. | Normality NaOH | Mol Ratio Ca:Be | Percent Be Precipitated |
|---|---|---|---|---|
| 0.258 | 0.000 | 1.37 | 3:1 | 30.9 |
| 0.258 | 3.23 | 1.37 | 3:1 | 89.8 |
| 0.258 | 6.46 | 1.37 | 3:1 | 91.3 |
| 0.258 | 9.7 | 1.37 | 3:1 | 100.0 |
| 0.258 | 12.5 | 1.37 | 3:1 | 96.3 |

In another series of tests, the effect of increasing the hydroxide concentrations was observed when the silica concentration was held constant. The results are summarized in table III.

TABLE III

Effect of Sodium Hydroxide Concentration On

Beryllium Precipitation

| mg. of Be/ml. | mg. of $SiO_2$/ml. | Normality NaOH | Mol Ratio Ca:Be | Percent Be Precipitated |
|---|---|---|---|---|
| 0.202 | 7.5 | 1.4 | 3:1 | 86.0 |
| 0.202 | 7.5 | 2.4 | 3:1 | 49.0 |
| 0.202 | 7.5 | 3.4 | 3:1 | 31.9 |
| 0.202 | 7.5 | 4.4 | 3:1 | 16.0 |
| 0.202 | 7.5 | 5.4 | 3:1 | None |

EXAMPLE 3

100 grams of beryllium ore was placed in a 10 $N$ sodium hydroxide solution. The mixture was heated at 110° C. for 20 minutes and then centrifuged. About 370 ml. of supernatant liquid were recovered. 370 ml. of new 10 $N$ sodium hydroxide were added after which the heating and centrifuging steps were repeated. The supernatant liquid resulting from the initial step. The ore pulp was then washed with portions of water until a total of 260 ml. of wash water was used. The wash water was combined with the leach liquors.

Analysis of the solution resulting from the combination of the leach liquors and the wash water reported concentrations of 762 micrograms per milliliter (mg./ml.) beryllium, 13.0 grams per liter (g./l.) silica, and sodium hydroxide, 8.27 N. The percentage extraction of beryllium from the pulp was 89.7.

The solution comprising the leach liquors and the wash water was diluted with water until the sodium hydroxide concentration was about 1.5 N. An 80 excess of calcium hydroxide was added, the amount of addition being based on calcium silicate ($CaSiO_3$) formation, and the solution was autoclaved at 150° C. By this technique, 96 of the silica and 95 of the beryllium were precipitated together with calcium hydroxide. Essentially all of the other contaminates remained in solution.

EXAMPLE 4

The dilute sodium hydroxide solution resulting from removal of the precipitate in example 3 was evaporated under reduced pressure until the normality of the sodium hydroxide reached 9.73 N. The concentration of silica was 2.5 g./l. and of beryllium was 46.2 mg./ml. This liquid was used to leach a corresponding amount of beryllium ore according to the method set forth in Example 3. The extraction of beryllium from the beryllium ore was in excess of 95 percent. Thus, the reconcentrated sodium hydroxide solution was effective in leaching a new portion of beryllium ore.

EXAMPLE 5

A solution was prepared comprising 870 mg./ml. beryllium and 25.1 g./l. silica in 200 cubic centimeters (cc.) of 10 $N$ sodium hydroxide. The solution, without adjustment of the pH, was treated with a solid calcium hydroxide in the amount of 10 excess over that amount needed to form $CaSiO_3$, the product indicated by X-ray refraction The solution was gradually heated in an autoclave through a range of temperatures of 60° to 190° C. Samples were analyzed at progressively increasing temperatures at uniform time increments and it was found that most of the silica was selectively precipitated without accompanying precipitation of substantial amounts of beryllium. The effect of the time-related temperature range on the percent silica in solution is graphically illustrated as curve 10 in FIG. 3.

During the complete run of the experiment, more than 95 percent of the beryllium remained in solution, and as illustrated in FIG. 3, essentially complete precipitation of the silica occurred in about 103 minutes in the comparatively high concentration of hydroxide.

EXAMPLE 6

Three aliquots of the solution prepared as in example 3 were heated in individual autoclaves at respective temperatures of 120° C., 130° C. and 150° C. The respective solutions, each having a hydroxide concentration of approximately 10 N, were then treated with solid calcium hydroxide in the same amount as stated in example 3. The calcium hydroxide was fixed in a cellophane bag inside the autoclave during the time needed to bring the system to a desired temperature. It was possible then to release the calcium hydroxide into the solution and stir the solution throughout the heating interval. The heating intervals, therefore, represent the actual period of contact between the calcium hydroxide and the dissolved silica.

Samples of the solutions were analyzed at predetermined time increments to determine the percent silica in the solution. The effect of time on the concentration of silica in the solutions is graphically illustrated in FIG. 4. Curve 12 represents the solution aliquot maintained at a temperature of 120° C. Curve 14 represents the solution aliquot maintained at a temperature of 130° C. and curve 16 represents the solution aliquot maintained at a temperature of 150° C. A temperature of 150° C. was the most effective in the precipitation of silica from the solution and the precipitation was essentially complete in 150 minutes. Significantly, a sizable portion of the silica (75–80 percent) was precipitated within 30 minutes at 130° C. and 150° C. There was essentially no change in the concentration of the beryllium in the solution in any of the three stated solution.

EXAMPLE 7

Another aliquot of the solution prepared as in Example 3 was placed in an autoclave and elevated in temperature to 130° C. Thereafter, without adjusting the pH of the solution, preweighed portions of calcium hydroxide were serially stirred into the solution and samples of the solution were removed and analyzed for silica 30 minutes after each addition.

In FIG. 5, curve 18 graphically illustrates a change in percent silica in the solution with the amount of calcium hydroxide added. Vertical line 20 represents the amount of calcium hydroxide at which the calcium-silica ($Ca:SiO_2$) ratio is 1:1, the determination being made 30 minutes after the next previous addition of calcium hydroxide. Vertical line 22 represents the amount of calcium hydroxide at which the $Ca:SiO_2$ ratio is 1.5:1, the determination being made at a 30-minute interval after the next previous addition of calcium hydroxide.

As illustrated in FIG. 5, more than 85 percent of the silica was removed from the solution within a 30-minute interval after the Ca:SiO$_2$ ratio reached 1:1. The precipitation of silica was nearly complete within 30 minutes after the Ca:SiO$_2$ ratio reached 1.5:1. The percentage of beryllium remained essentially unchanged at about 93 percent.

From the foregoing experimental evidence, it is apparent that beryllium may be effectively leached from beryllium ore in an economically superior way with a caustic solution and beryllium may be separated from contaminants by (a) diluting the leach liquor and adding calcium chloride, calcium hydroxide or calcium oxide to precipitate all but a negligible amount of beryllium or (b) adding calcium hydroxide without dilution of the leach liquor to precipitate the silica without precipitating a significant amount of beryllium. The removal of silica, of course, allows for the reclaiming and reuse of the caustic.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by U.S. Letters Patent is:

1. In a process of recovering beryllium from a naturally occurring low grade ore, the steps of leaching the ore in an open vessel with a caustic solution comprising sodium hydroxide in a range between 5 to 10 Normal, subjecting the leaching solution and ore in the open vessel to an elevated temperature in a range of about 100° C. to 200° C. for a time increment of about 5 to 20 minutes, separating the leach liquor resulting from the leaching steps from the ore, and thereafter removing the leached beryllium from the solution.

2. A process as defined in claim 1 wherein the removing step comprises diluting the leach liquor until the hydroxide concentration is in a range of 4 to 1 Normal.

3. In a method of providing an essentially silica-free solution of beryllium, the steps of:

leaching beryllium ore having silica therein at least once with concentrated alkali solution, the solution being elevated in temperature and carrying quantities of beryllium and silica; removing the solution from the ore pulp and, without significantly diluting the solution, adding an excess of a calcium compound selected from the group consisting of calcium oxide and calcium hydroxide to the undiluted solution, elevating the temperature of the solution until a silicate precipitate is formed, and separating the silicate precipitate from the undiluted solution.

* * * * *

PO-1050
(5/69)

UNITED STATES PATENT OFFICE
CERTIFICATE OF CORRECTION

Patent No. 3,615,260      Dated October 26, 1971

Inventor(s) Charles K. Hanson and Milton E. Wadsworth

It is certified that error appears in the above-identified patent and that said Letters Patent are hereby corrected as shown below:

Column 3, line 48, after "liquid" insert --recovered from the step was combined with the 370 ml supernatant liquid--;

Column 3, line 54, "(mg/ml)" should read --(mcg/ml)--;

Column 3, line 55, "(g/ml)" should read --(gm/ml)--;

Column 3, line 57, "89.7" should read --89.7%--;

Column 3, line 60, "80" should read --80%--;

Column 3, line 63, "96" should read --96%--;

Column 3, line 63, "95" should read --95%--;

Column 3, line 72, "g/l" should read --gm/l--;

Column 3, line 73, "mg/ml" should read --mcg/ml--;

Column 4, line 7, "mg/ml" should read --mcg/ml--;

Column 4, line 8, "g/l" should read --gm/l--;

Column 4, line 11, "10" should read --10%--;

Column 4, line 12, change "refraction" to --defraction.--;

Column 4, line 58, change "solution" to --solutions--.

Signed and sealed this 2nd day of May 1972.

(SEAL)
Attest:

EDWARD M. FLETCHER, JR.
Attesting Officer

ROBERT GOTTSCHALK
Commissioner of Patents